US009246943B2

(12) United States Patent
French et al.

(10) Patent No.: US 9,246,943 B2
(45) Date of Patent: Jan. 26, 2016

(54) DETERMINING SECURITY FACTORS ASSOCIATED WITH AN OPERATING ENVIRONMENT

(71) Applicant: International Business Machines Corporation, Armonk, NY (US)

(72) Inventors: Paul B. French, Cork (IE); Jack Healy, Carrigaline (IE); Niall J. Lucey, Carrigadrohid (IE); Michael Truss, Cork (IE)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 13/860,710

(22) Filed: Apr. 11, 2013

(65) Prior Publication Data

US 2014/0310763 A1    Oct. 16, 2014

(51) Int. Cl.
| | |
|---|---|
| *G06F 17/00* | (2006.01) |
| *H04L 29/06* | (2006.01) |
| *G06F 17/30* | (2006.01) |
| *H04W 12/06* | (2009.01) |
| *G06F 15/173* | (2006.01) |

(52) U.S. Cl.
CPC ............... *H04L 63/20* (2013.01); *H04L 63/08* (2013.01); *H04W 12/06* (2013.01)

(58) Field of Classification Search
CPC ... H04L 63/102; H04L 63/20; H04L 63/0227; G06F 21/6218; G06F 21/604
USPC .......................... 726/1; 713/155–159; 709/22
See application file for complete search history.

(56) References Cited

U.S. PATENT DOCUMENTS

| | | |
|---|---|---|
| 6,912,676 B1 | 6/2005 | Gusler et al. |
| 8,990,891 B1 * | 3/2015 | Chickering ............. G06F 21/44 726/1 |

(Continued)

FOREIGN PATENT DOCUMENTS

WO    2011149543 A1    12/2011

OTHER PUBLICATIONS

Brett Berger, "Data-Centric Quantitative Computer Security Risk Assessment", GSEC Practical Version 1.4b, Aug. 20, 2003, copyright SANS Institute 2003.

(Continued)

*Primary Examiner* — Evans Desrosiers
(74) *Attorney, Agent, or Firm* — Daniel R. Simek (57) ABSTRACT

Embodiments of the present invention disclose a method, computer program product, and system for determining security factors associated with an operating environment for a computer through a wireless network. The computer identifies one or more local computers operating within range of wireless communications to the computer through a wireless network. The computer determines a current operating environment corresponding to the one or more identified local computers. The computer determines a current security value for the current operating environment corresponding to identities and security of the identified local computers. The computer identifies data corresponding to the current operating environment, the data corresponding to a current time period of the current operating environment. The computer determines security information corresponding to the current operating environment, wherein the security information includes a familiarity of the computer to the current operating environment, and a historical security of the computer in the current operating environment.

14 Claims, 4 Drawing Sheets

(56) References Cited

U.S. PATENT DOCUMENTS

| | | |
|---|---|---|
| 2002/0184068 A1 | 12/2002 | Krishnan et al. |
| 2005/0272445 A1 | 12/2005 | Zellner |
| 2010/0017874 A1 | 1/2010 | Piccinini et al. |
| 2012/0117633 A1 | 5/2012 | Chakra et al. |
| 2013/0055335 A1* | 2/2013 | Chien ............... G06F 21/74 726/1 |

OTHER PUBLICATIONS

Herfurt et al., "Blueprinting" White Paper Version 0.3, Dec. 20, 2004.

Netland, "Assessing and Mitigating Risks in Computer Systems", Jun. 2008.

Nikolic et al., "Risk Assessment of Information Technology Systems", Issues in Informing Science and Information Technology, vol. 6, 2009.

Pang et al. "802.11 User Fingerprinting", MobiCom '07, Sep. 9-14, 2007, Montreal, Quebec, Canada, Copyright 2007, ACM 978-1-59593-681-03/07/0009.

"Detecting iPhone and Android Smartphones by Wifi and Bluetooth", <http://www.libelium.com/products/meshlium/smartphone-detection>, date Apr. 10, 2013.

U.S. Appl. No. 14/467,421, entitled "Determining Security Factors Associated With an Operating Environment", filed Aug. 25, 2014.

* cited by examiner

DETERMINING SECURITY FACTORS ASSOCIATED WITH AN OPERATING ENVIRONMENT

FIELD OF THE INVENTION

The present invention relates generally to the field of information security, and more particularly to determining security factors associated with an operating environment.

BACKGROUND OF THE INVENTION

Computing devices such as laptop computers, personal computers, and mobile devices can be protected from unauthorized access using a wide variety of user authentication mechanisms. Some examples of user authentication mechanisms include a username and password, Personal Identification Number (PIN), and a digital fingerprint. Computing devices can utilize different security policies corresponding to different situations in which the computing device operates. A geographic location of a computing device can be utilized to determine an appropriate security policy for the computing device. Responsive to different situations implemented on a computing device, the security policies can define different levels of user authentication mechanisms and procedures. Computing devices operate in many different environments of varying levels of security. In these operating environments, computing devices can communicate with other devices through communication networks and protocols such as Bluetooth® and WiFi® to share information.

SUMMARY

Embodiments of the present invention disclose a method, computer program product, and system for determining security factors associated with an operating environment for a computer through a wireless network. The computer identifies one or more local computers operating within range of wireless communications to the computer through a wireless network. The computer determines a current operating environment corresponding to the one or more identified local computers. The computer determines a current security value for the determined current operating environment corresponding to identities and security of the one or more identified local computers. The computer identifies data corresponding to the determined current operating environment, wherein the data corresponds to a current time period of the determined current operating environment. The computer determines security information corresponding to the determined current operating environment, wherein the determined security information includes a familiarity of the computer to the determined current operating environment, and a historical security of the computer in the determined current operating environment.

DETAILED DESCRIPTION

Exemplary embodiments of the present invention recognize that different operating environments for computing devices can pose different levels of security risks for the computing devices. Some operating environments can have different security levels corresponding to computing devices included in the operating environment and utilization of the computing devices. Security policies can modify user authentication mechanisms and procedures responsive to the security level of a computing devices operating environment. Exemplary embodiments of the present invention recognize that a familiarity of a computing device to an operating environment and a security level of the operating environment can be important factors in determining a security policy for the computing device in that operating environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
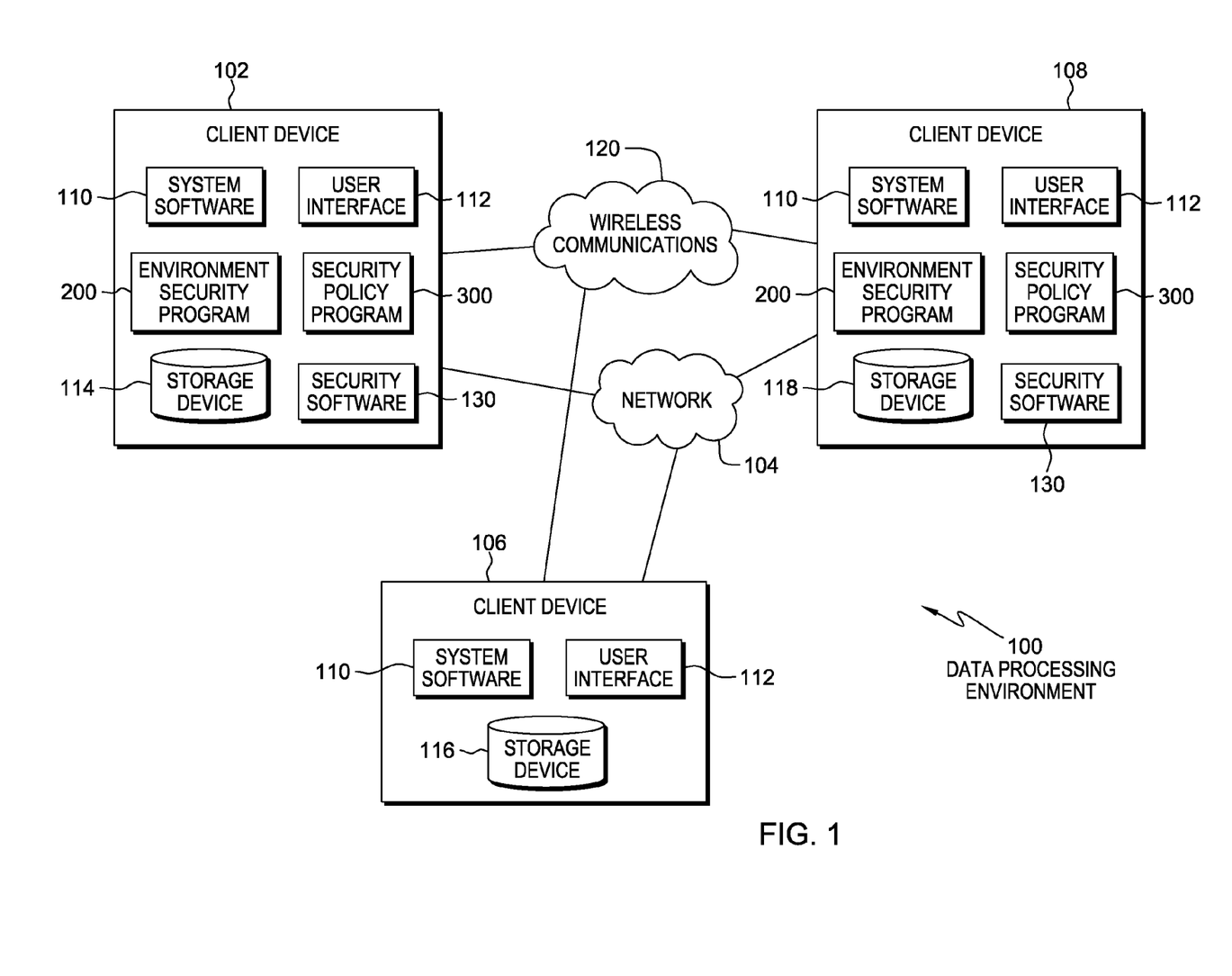
FIG. 1 is a functional block diagram of a data processing environment in accordance with an embodiment of the present invention.

The present invention will now be described in detail with reference to the Figures. FIG. 1 is a functional block diagram illustrating data processing environment 100, in accordance with one embodiment of the present invention.

An exemplary embodiment of data processing environment 100 includes client devices 102, 106 and 108 connected through network 104 and connected through wireless communications 120. In one embodiment, data processing environment 100 depicts client devices 102, 106 and 108 operating in the same environment, connected and communicating through network 104 and wireless communications 120. In various embodiments of the present invention, client devices 102, 106 and 108 may be workstations, laptops, personal computers, personal digital assistants, mobile phones, or any other devices capable of executing program instructions. In general, client devices 102, 106 and 108 are representative of any electronic device or combination of electronic devices capable of executing machine-readable program instructions, as described in greater detail with regard to FIG. 4. In alternate embodiments, data processing environment 100 can include other instances of client devices 102, 106 and 108 (i.e. can have more or less).

Client devices 102, 106 and 108 include system software 110, and user interface 112. In one embodiment, each instance of client devices 102, 106, and 108 includes iterations of the same system software 110, and user interface 112. System software 110 may exist in the form of operating system software, which may be Windows®, LINUX®, and other application software such as internet applications and web browsers. In one embodiment, user interface 112 allows for input into client devices 102, 106, and 108. In another, embodiment, client devices 102 and 108 include environment security program 200, security policy program 300, and security software 130. In exemplary embodiments, environment security program 200 determines a security level for an operating environment. Environment security program 200 is discussed in greater detail with regard to FIG. 2. In exemplary embodiments, security policy program 300 determines a familiarity to and a historical security of an operating environment. Security policy program 300 is discussed in greater detail with regard to FIG. 3. Security software 130 can be any program or set of programs that client device 102 and 108 can utilize to determine an appropriate security policy for the client devices (i.e. what type of authentication challenge to present an individual utilizing the client devices). In exemplary embodiments, security software 130 receives input from security policy program 300. In another embodiment, client device 106 is representative of a client device not including environment security program 200 and security policy program 300.

In exemplary embodiments, client devices 102, 106 and 108 include respective instances of storage devices 114, 116 and 118 (client device 102 includes storage device 114, client device 106 includes storage device 116, and client device 108 includes storage device 118). Storage devices 114, 116 and 118 include information corresponding to the corresponding client device 102, 106 or 108. Storage devices 114, 116 and 118 can be implemented with any type of storage device that is capable of storing data that may be accessed and utilized by client devices 102, 106 and 108 such as a database server, a hard disk drive, or flash memory. In other embodiments, storage devices 114, 116 and 118 can represent multiple storage devices within client device 102, 106 or 108. Data stored in storage devices 114, 116 and 118 can include, but is not limited to: records of environments that client device 102, 106 or 108 have operated in, records of devices operating in an environment, records of authentication failures (i.e. failed login attempts), activity the client device, and other information corresponding to the client device. In exemplary embodiments, client devices 102, 106 and 108 store information corresponding to the security of operating environments in respective storage devices 114, 116 and 118.

In one embodiment, elements of data processing environment 100 communicate through network 104 and wireless communications 120. Network 104 can be, for example, a local area network (LAN), a telecommunications network, a wide area network (WAN) such as the Internet, or a combination of the three, and include wired, wireless, or fiber optic connections. In general, network 104 can be any combination of connections and protocols that will support communications between client devices 102, 106 and 108 in accordance with exemplary embodiments of the present invention. In exemplary embodiments, wireless communications 120 include protocols such as Bluetooth® and WiFi® communications between client devices 102, 106 and 108. In exemplary embodiments, wireless communications 120 allows client devices 102, 106 and 108 to broadcast and share information without having the client devices connected to network 104.

Figure 2:
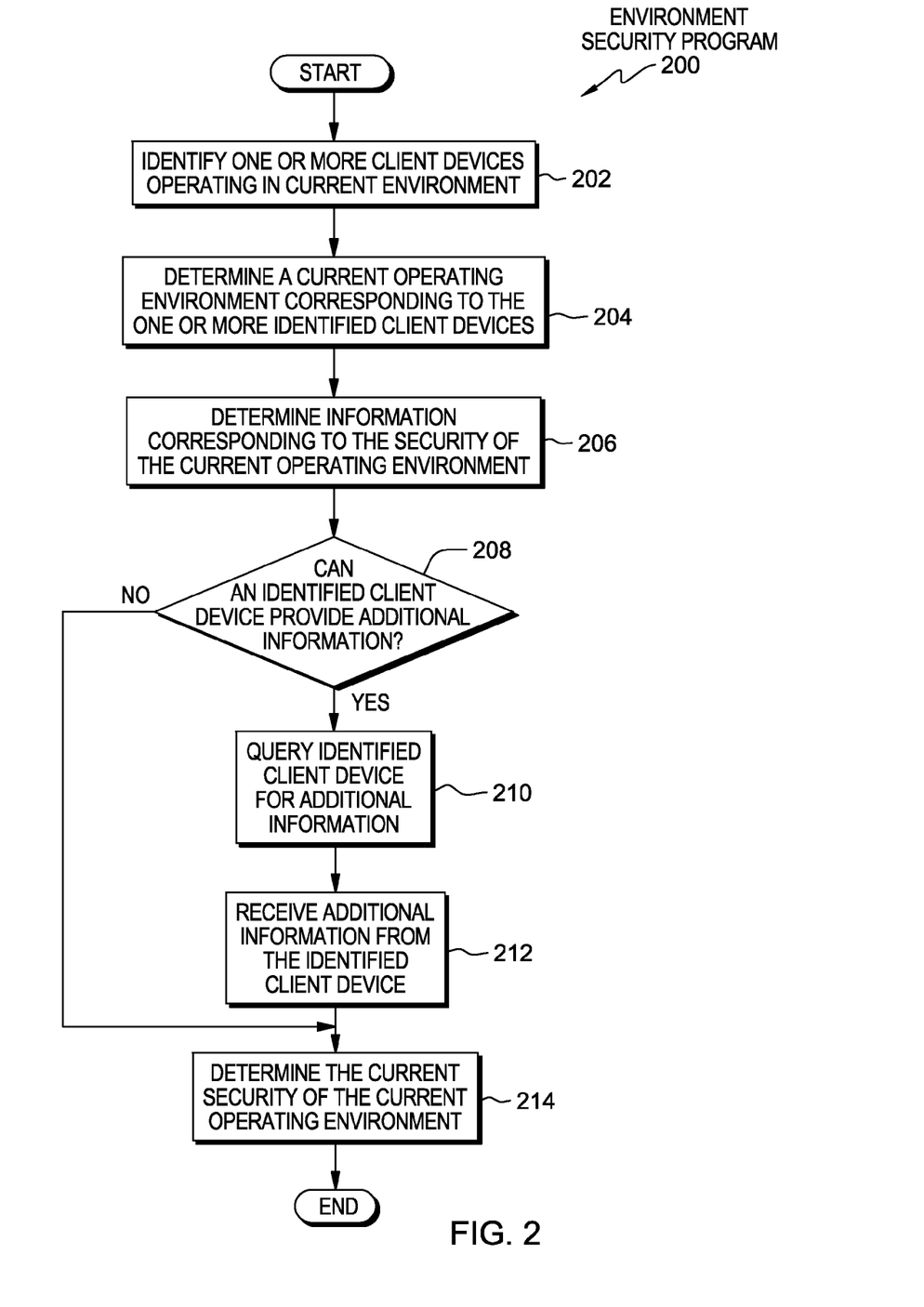
FIG. 2 is a flowchart depicting operational steps of a program for determining a current operating environment and a current security value for the determined current operating environment, in accordance with an embodiment of the present invention.

FIG. 2 is a flowchart depicting operational steps of environment security program 200 in accordance with an exemplary embodiment of the present invention. In one embodiment, environment security program 200 initiates during boot up of client device 102 and 108. In another embodiment, environment security program 200 can initiate periodically while client devices 102 or 108 are operating. FIG. 2 depicts an exemplary embodiment with regard to client device 102 booting up within data processing environment 100.

In step 202, environment security program 200 identifies one or more client devices operating in a current environment. In one embodiment, during boot up phase of client device 102, environment security program 200 utilizes wireless communications 120 (i.e. Bluetooth® and WiFi® protocols) to scan data processing environment 100 to identify devices (i.e. client devices 106 and 108) in the data processing environment. In an exemplary embodiment, environment security program 200 utilizes wireless communications 120 to identify client devices 106 and 108 prior to client device 102 joining network 104. Client devices 102, 106 and 108 periodically broadcast messages identifying the client devices through wireless communications 120, allowing for a passive detection and identification of the client devices operating in data processing environment 100. In exemplary embodiments, the passive detection and identification of client devices 102, 106 and 108 allows environment security program 200 to identify the client devices in data processing environment without being connected to the client devices through network 104. Environment security program 200 utilizes wireless communications 120 to detect and identify devices (i.e. client devices 102, 106 and 108) close enough to communicate through wireless signals (i.e. Bluetooth® and WiFi® protocols).

In step 204, environment security program 200 determines a current operating environment corresponding to the one or more identified client devices. In an exemplary embodiment, environment security program 200 determines the current operating environment of client device 102 to be the one or more identified client devices (client devices 106 and 108 from step 202). In an example, environment security program 200 on client device 102 determines a current operating environment of client devices 106 and 108 for client device 102. In this example, environment security program 200 can compare the determined operational environment with previously determined operational environments stored in storage device 114. If environment security program 200 determines that storage device 114 already contains information corresponding to the determined operating environment, environment security program 200 updates the information in storage device 114 corresponding to the determined operating environment. If environment security program 200 determined that storage device 114 does not contain the determined operating environment, environment security program 200 saves the determined operating environment in the storage device, allowing environment security program 200 to save information corresponding to the determined operating environment in the storage device.

In step 206, environment security program 200 determines information corresponding to the security of the current operating environment. In an exemplary embodiment, environment security program 200 utilizes wireless communications 120 to determine information stored in storage devices 114, 116, and 118 associated with client devices 102, 106, and 108 that correspond to the security of the current operating environment. The determined information can include, but is not limited to: a device type, a manufacturer of the device, and other identifying factors corresponding to an identity of client devices 102, 106 and 108 that storage devices 114, 116 and 118 can store. In exemplary embodiments, devices utilizing WiFi® and Bluetooth® protocols can periodically broadcast a hello message to an operating environment, wherein the hello messages include a device classification (device type), and a manufacturer of the device.

In decision step 208, environment security program 200 determines whether an identified client device can provide additional information. In one embodiment, environment security program 200 determines whether an identified device (i.e. client device 106 and 108) includes environment security program 200 and security policy program 300, which allow for sharing of additional information through wireless communications 120. When a determined current operating environment includes one or more client devices (i.e. client devices 106 and 108), environment security program 200 determines whether an identified client device includes additional information for each identified client device in the determined current operating environment. In an example with regard to client device 106, environment security program 200 determines that the client devices do not include environment security program 200 and security policy program 300, and therefore the client device does not include (and cannot provide) additional information. In another example with regard to client device 108, environment security program 200 determines that the client device does include environment security program 200 and security policy program 300, and therefore the client device includes additional information. In exemplary embodiments, devices utilized by the same organization (i.e. client device 102 and 108) contain environment security program 200 and security policy program 300, and allow for sharing of additional information between devices through wireless communications 120.

In step 210, environment security program 200 queries the identified client device for additional information. In one embodiment, responsive to determining that an identified client device (i.e. client device 108) can provide additional information, environment security program 200 queries the identified client device for additional information. The additional information environment security program 200 queries can include, but are not limited to: a hash of a username associated with an individual logged into client devices 102, 106 and 108, a count of recent authentication failures (i.e. failed log in attempts) on the client devices of the operating environment, a hash of a username associated with a recent authentication failure, or other information corresponding to the security of the current operating environment that is stored in storage devices 114, 116 and 118. In exemplary embodiments, the additional information that client devices 106 and 108 share can be defined through policies implemented on the client devices. In an example, an individual or organization owning client devices 102, 106 or 108 can define which information the client devices share. In this example, the organization owning client devices 108 defines that the additional information that the client device shares is a hash of a username associated with an individual logged into the client device, and a count of authentication failures occurring within the last hour. The additional information that client devices 106 and 108 share can be stored on storage devices 116 and 118.

In step 212, environment security program 200 receives additional information from the identified client device. In an exemplary embodiment, environment security program 200 receives information from client device 108 (stored in storage device 118) responsive to a query sent by the environment security program of client device 102. In an example, client device 108 provides information indicating three recent authentication failures associated with one username occurred on the client device.

In step 214, environment security program 200 determines the current security of the current operating environment. In one embodiment, environment security program 200 utilizes information corresponding to the security of the current operating environment (from step 206), and additional information (from step 212). In exemplary embodiments, environment security program 200 utilizes information from client devices 106 and 108 to determine the current security of the determined current operating environment of client device 102. With regard to client device 106, environment security program 200 can utilize identifying factors (i.e. device type, device manufacturer) that the client device provides in step 206. With regard to client device 108, environment security program 200 can utilize identifying factors that the client device provides in step 206, and additional information that the client device provides in step 212. In an exemplary embodiment, environment security program 200 determines the current security of the current operating environment to be a function of the count of recent authentication failures within the determined current operating environment (i.e. client device 108). In one embodiment, environment security program 200 stores the determined current security of the current operating environment in storage device 114.

Figure 3:
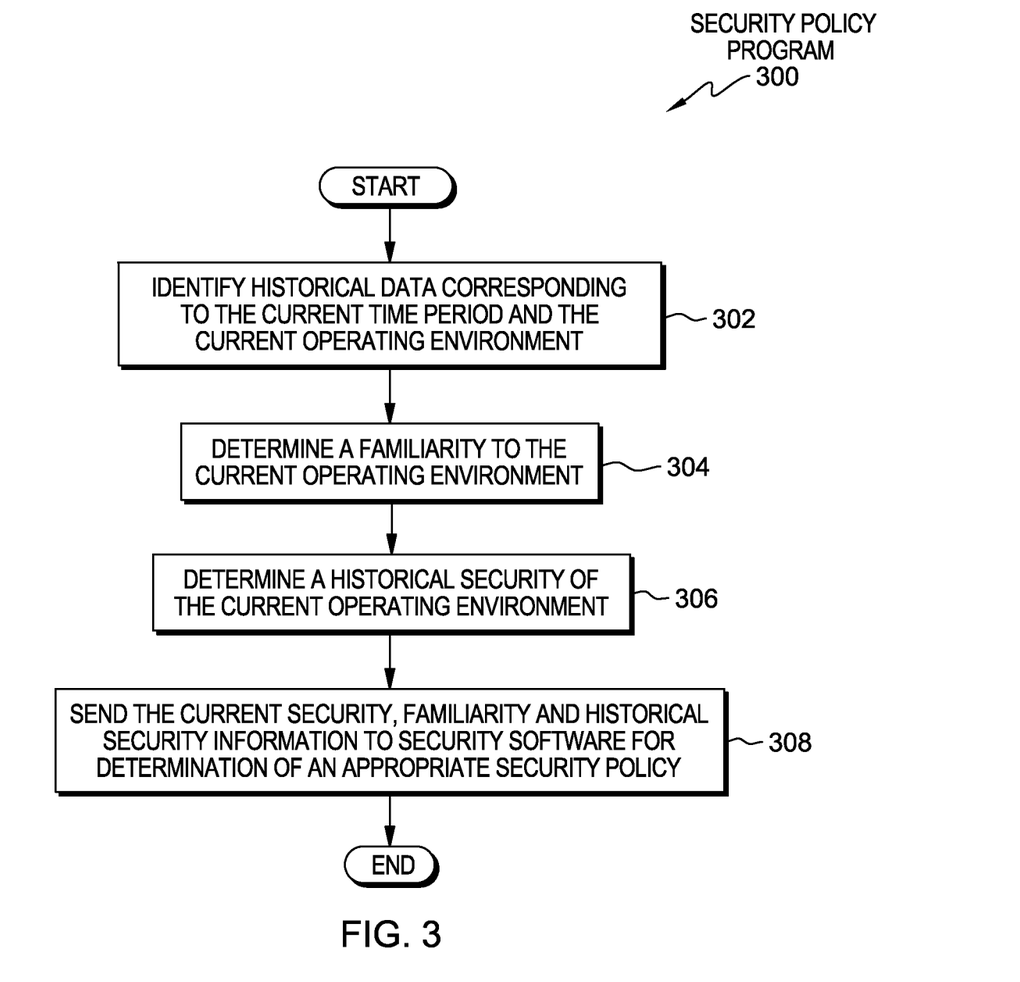
FIG. 3 is a flowchart depicting operational steps of a program for determining historical security information for the determined current operating environment, in accordance with an embodiment of the present invention.

FIG. 3 is a flowchart depicting operational steps of security policy program 300 in accordance with an exemplary embodiment of the present invention. In one embodiment, security policy program 300 initiates after environment security program 200 determines the current security of the current operating environment. Exemplary embodiments of FIG. 3 are discussed with regard to client device 102 accessing storage device 114 to determine information associated with the security of the determined current operating environment.

In step 302, security policy program 300 identifies historical data corresponding to the current time period and the current operating environment. In an exemplary embodiment with regard to client device 102, security policy program 300 identifies historical data (i.e. records in storage device 114) stored in storage device 114 corresponding to the current time period (i.e. indication of day of the week, time zone, time of the day) of the client device in the current operating environment. The historical data security policy program identifies can include records of environments that client device 102, 106 or 108 have operated in, records of devices operating in an environment, and records of authentication failures (i.e. failed login attempts). In a first example, security policy program 300 accesses storage device 114 and identifies sixteen records corresponding to the current time period. In this example, the identified records correspond to previous instances of client device 102 operating during the current time period (i.e. current time during the current weekday). In a second example, security policy program 300 accesses storage device 114 and identifies twelve records corresponding to the current time period and the current operating environment. In this example, the current operating environment is client devices 106 and 108 (determined in step 204 of environment security program 200). The twelve records identified in the second example are a subset of the sixteen records identified in the first example. In a third example, security policy program 300 accesses storage device 114 and identifies three records corresponding to the current time period and the current operating environment and where a record indicates at least one authentication failure on client device 102. In this example, the current operating environment is client devices 106 and 108 (determined in step 204 of environment security program 200), and the authentication failures represent authentication failures on client device 102. The three records identified in the third example are a subset of the twelve records identified in the second example.

In step 304, security policy program 300 determines a familiarity to the current operating environment. In one embodiment, security policy program 300 utilizes data identified in step 302 to determine a familiarity as a percentage representing how frequently client device 102 is operating in the current operating environment at the current time period. In an example with regard to the previously discussed first and second examples, security policy program 300 determines the familiarity to be the number of records corresponding to the current time period and the current operating environment (twelve from the second example) as a percentage of the number of records corresponding to the current time period (sixteen from the first example). In this example, security policy program 300 determines a familiarity of 75%. A familiarity of 75% indicates that 75% of the time that client device 102 is operating during the current time period, the client device is operating in the current operating environment.

In step 306, security policy program 300 determines a historical security of the current operating environment. In one embodiment, security policy program 300 utilizes data identified in step 302 to determine a historical security level as a percentage representing how frequently authentication failures occur in the current operating environment at the current time period. In an example with regard to the previously discussed second and third examples, security policy program 300 determines the historical security to be the number of records corresponding to the current time period and the current operating environment, and where a record indicates at least one authentication failure (three from the third example) as a percentage of the number of records corresponding to the current time period and the current operating environment (twelve from the second example). In this example, security policy program 300 determines a historical security of 25%. A historical security of 25% indicates that 25% of the time that client device 102 is operating in the current operating environment during the current time period, the client device experiences an authentication failure.

In step 308, security policy program 300 sends the current security, familiarity, and historical security information to security software 130 for determination of an appropriate security policy. In one embodiment, security policy program 300 sends the current security (step 214 of environment security program 200), the familiarity (step 304), and the historical security (step 306) information to security software 130. In exemplary embodiments, security software 130 can utilize the current security, familiarity, and historical security information to assist in determining a security policy for client device 102. In another embodiment, environment security program 200 and security policy program 300 can periodically operate and reevaluate the current operating environment while client device 102 is operating in the current operating environment.

Figure 4:
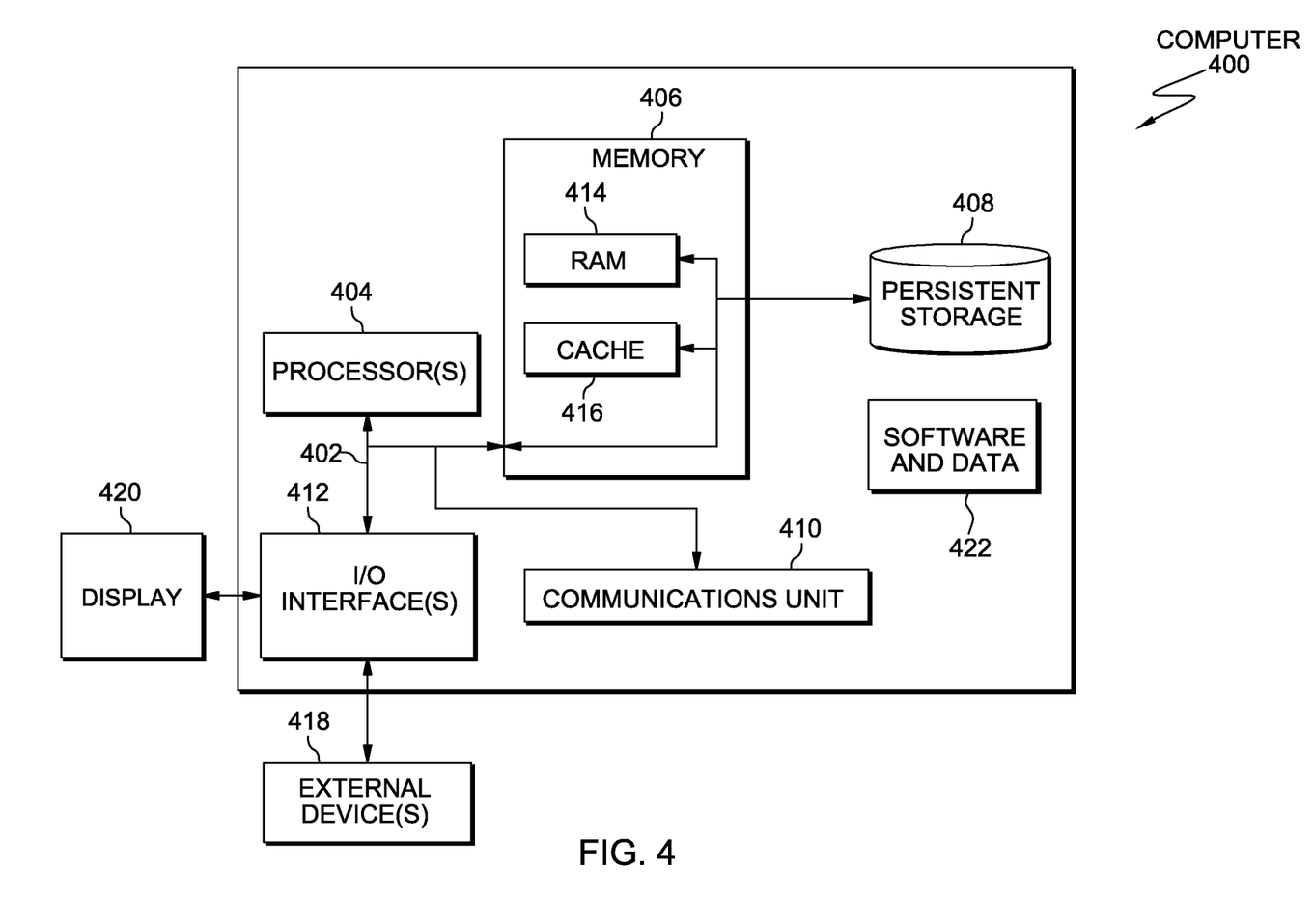
FIG. 4 depicts a block diagram of components of the computing system of FIG. 1 in accordance with an embodiment of the present invention.

FIG. 4 depicts a block diagram of components computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media. Software and data 422 stored in persistent storage 408 for access and/or execution by processor(s) 404 via one or more memories of memory 406. With respect to client devices 102 and 108, software and data 422 includes system software 110, security software 130, environment security program 200, and security policy program 300. With respect to client device 106, software and data 422 includes system software 110.

In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data 422 can be stored on such portable computer-readable storage media and can be loaded onto persistent storage 408 via I/O interface(s) 412. I/O interface(s) 412 also can connect to a display 420.

Display 420 provides a mechanism to display data to a user and may be, for example, a computer monitor. Display 420 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for determining security factors associated with an operating environment for a computer through a wireless network, the computer program product comprising:
   one or more computer-readable storage devices and program instructions stored on the one or more computer-readable storage devices, the program instructions comprising:
   program instructions to identify one or more local computers, wherein the one or more local computers are computing devices that are operating within a range of wireless communications to the computer through the wireless network;
   program instructions to determine a current operating environment of computing devices that includes the computer and the one or more identified local computers that are operating within a range of wireless communications to the computer through the wireless network;
   program instructions to determine a current security value for the determined current operating environment of computing devices utilizing information corresponding to identities of the one or more identified local computers in the determined current operating environment of computing devices, and a security of the one or more identified local computers in the determined current operating environment of computing devices;
   program instructions to identify data corresponding to the determined current operating environment of computing devices, wherein the data corresponds to a current time period of the determined current operating environment of computing devices;
   program instructions to determine security information corresponding to the determined current operating environment of computing devices,
   wherein the determined security information includes a familiarity of the computer to the determined current operating environment of computing devices based on information indicating how frequently the computer is operating in the determined current operating environment of computing devices during the current time period, and wherein a historical security of the computer in the determined current operating environment of computing devices based on information indicating how frequently authentication failures occur on the computer when the computer is operating in the determined current operating environment of computing devices during the current time period.

2. The computer program product of claim 1, further comprising program instructions to:

send the determined current security value and the determined security information to a program for determining a security policy for the computer.

3. The computer program product of claim 1, wherein said program instructions to determine current security value for the determined current environment of computing devices further comprises program instructions to:

identify information corresponding to an identity of the one or more identified local computers that are operating within a range of wireless communications to the computer through the wireless network;

determine whether a first of the one or more identified local computers includes additional information corresponding to the security of the first of the one or more identified local computers in the determined current operating environment of computing devices;

responsive to determining the first of the one or more identified local computers includes additional information corresponding to the security of the first of the one or more identified local computers in the determined current operating environment of computing devices, to query the first of the one or more identified local computers for the additional information corresponding to the security of the first of the one or more identified local computers in the determined current operating environment of computing devices; and receive additional information corresponding to the security of the first of the one or more identified local computers in the determined current operating environment of computing devices from the first of the one or more identified local computers that are operating within a range of wireless communications to the computer through the wireless network.

4. The computer program product of claim 3, wherein the additional information corresponding to the security of the first of the one or more identified local computers includes a number of authentication failures that have occurred on the first of the one or more identified local computers that are operating within a range of wireless communications to the computer through the wireless network.

5. The computer program product of claim 1, wherein the identifying one or more local computers occurs during a boot up phase for the computer.

6. The computer program product of claim 1, wherein the wireless communications that the computer identifies one or more local computers utilize Bluetooth® or WiFi® protocols.

7. The computer program product of claim 1, wherein the current time period includes an indication of a weekday, a time of day during the weekday, and a time zone of the determined current operating environment of computing devices.

8. A computer system for determining security factors associated with an operating environment for a computer through a wireless network, the computer system comprising:

one or more computer processors; and one or more computer-readable storage devices;

program instructions stored on the computer-readable storage devices for execution by at least one of the one or more processors, the program instructions comprising:

program instructions to identify one or more local computers, wherein the one or more local computers are computing devices that are operating within a range of wireless communications to the computer through the wireless network;

program instructions to determine a current operating environment of computing devices that includes the computer and the one or more identified local computers that are operating within a range of wireless communications to the computer through the wireless network;

program instructions to determine a current security value for the determined current operating environment of computing devices utilizing information corresponding to identities of the one or more identified local computers in the determined current operating environment of computing devices, and a security of the one or more identified local computers in the determined current operating environment of computing devices;

program instructions to identify data corresponding to the determined current operating environment of computing devices, wherein the data corresponds to a current time period of the determined current operating environment of computing devices;

program instructions to determine security information corresponding to the determined current environment of computing devices, wherein the determined security information includes a familiarity of the computer to the determined current operating environment of computing devices based on information indicating how frequently the computer is operating in the determined current operating environment of computing devices during the current time period, and wherein a historical security of the computer in the determined current operating environment of computing devices based on information indicating how frequently authentication failures occur on the computer when the computer is operating in the determined current operating environment of computing devices during the current time period.

9. The computer system of claim 8, further comprising program instructions to:

send the determined current security value and the determined security information to a program for determining a security policy for the computer.

10. The computer system of claim 8, wherein said program instructions to determine current security value for the determined current operating environment of computing devices further comprises program instructions to:

identify information corresponding to an identity of the one or more identified local computers that are operating within a range of wireless communications to the computer through the wireless network;

determine whether a first of the one or more identified local computers includes additional information corresponding to the security of the first of the one or more identified local computers in the determined current operating environment of computing devices;

responsive to determining the first of the one or more identified local computers includes additional information corresponding to the security of the first of the one or more identified local computers in the determined current operating environment of computing devices, to query the first of the one or more identified local computers for the additional information corresponding to the security of the first of the one or more identified local computers in the determined current operating environment of computing devices; and receive additional information corresponding to the security of the first of the one or more identified local computers in the determined current operating environment of computing devices from the first of the one or more identified local computers that are operating within a range of wireless communications to the computer through the wireless network.

11. The computer system of claim 10, wherein the additional information corresponding to the security of the first of the one or more identified local computers includes a number of authentication failures that have occurred on the first of the one or more identified local computers that are operating within a range of wireless communications to the computer through the wireless network.

12. The computer system of claim 8, wherein the identifying one or more local computers occurs during a boot up phase for the computer.

13. The computer system of claim 8, wherein the wireless communications that the computer identifies one or more local computers utilize Bluetooth® or WiFi® protocols.

14. The computer system of claim 8, wherein the current time period includes an indication of a weekday, a time of day during the weekday, and a time zone of the determined current operating environment of computing devices.

* * * * *